United States Patent [19]
Znamirowski

[11] 3,727,271
[45] Apr. 17, 1973

[54] FASTENER
[75] Inventor: Henry Znamirowski, Columbia, Md.
[73] Assignee: Eastern Products Corporation, Columbia, Md.
[22] Filed: Apr. 12, 1971
[21] Appl. No.: 133,217

[52] U.S. Cl. .................................24/73 P, 85/5 R
[51] Int. Cl. ...............................................A44b 21/00
[58] Field of Search.....................24/213 CS, 213 B, 24/213 R, 214, 208 A, 73 R, 73 P, 73 MF, 73 FT, 73 PF, 73 HS, 73 D, 73 B, 73 PM, 73 AP, 73; 85/5, 80, DIG. 2; 16/2

[56] References Cited

UNITED STATES PATENTS

| 2,159,363 | 5/1939 | Chaffee | 24/213 B |
| 2,171,925 | 9/1939 | Fitts | 85/5 R |
| 2,692,414 | 10/1954 | Poupitch | 24/73 MF |
| 3,029,486 | 4/1962 | Raymond | 24/213 R X |
| 3,093,874 | 6/1963 | Rapata | 24/73 HS |

FOREIGN PATENTS OR APPLICATIONS

| 1,211,073 | 10/1959 | France | 85/5 R |

Primary Examiner—Donald A. Griffin
Attorney—Wolfe, Hubbard, Leydig, Voit & Osann

[57] ABSTRACT

A fastener for fastening together two thin structural layers having registering holes which includes a head, shank, and retention legs integrally molded of resilient plastic, the legs being of V-shape and sprung outwardly in V-configuration to facilitate insertion and each presenting an obtusely angled tip which is adjacent the head and spaced with respect to the head so that the presented angled edges of the legs symmetrically engage the edges of the hole in the adjacent layer to clamp the layers together while keeping the fastener captive.

4 Claims, 7 Drawing Figures

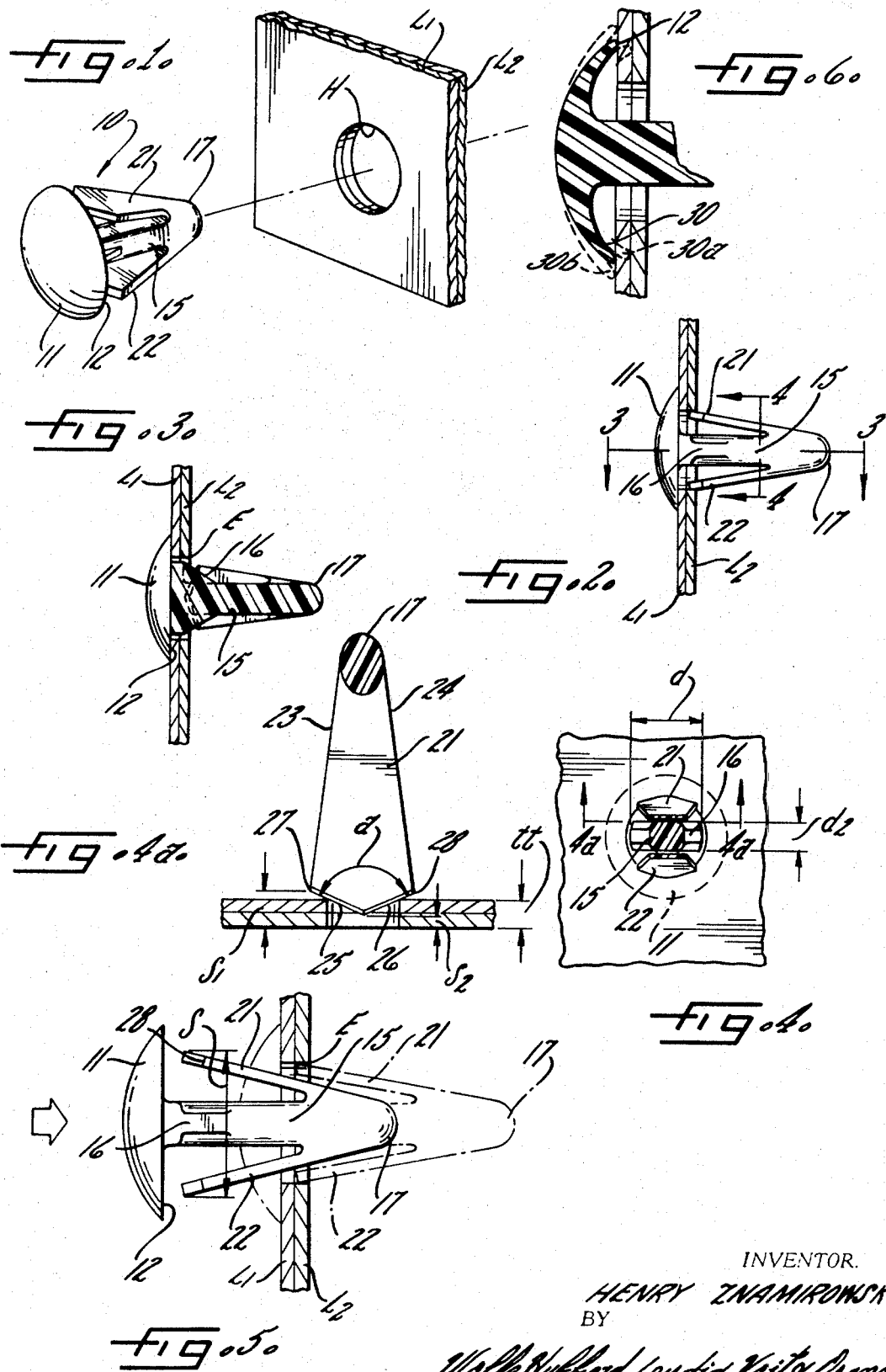

FASTENER

It is an object of the present invention to provide a fastener which is capable of securing two or more thin structural layers together, which is permanently captive yet capable of being removed, which continues to seat itself ever more firmly in position with the layers being ever more tightly clamped together. It is a more specific object to provide a fastener with follow-up action to take up any looseness which might tend to develop over a period of time. It is also an object to provide a fastener which produces reliable clamping action over a range of total thickness of the engaged layers, and which thereby permits a degree of tolerance in the thickness of the individual layers, which may be easily and quickly snapped into position, and which is strong and yet of simple, integral, low-cost construction, capable of being manufactured in quantity at a per unit cost which is less than that of other fasteners having comparable holding power.

Other objects and advantages of the invention will be apparent upon reading the attached detailed description and upon reference to the drawing in which:

FIG. 1 is an exploded view showing a fastener constructed in accordance with the present invention in readiness for insertion into registered openings formed in a pair of structural layers.

FIG. 2 is a side view showing the fastener seated in clamping position.

FIG. 3 is an axial section looking along the line 3—3 in FIG. 2.

FIG. 4 is a transverse section looking along the line 4—4 in FIG. 2.

FIG. 4a is a fragmentary section looking along the line 4a—4a in FIG. 4.

FIG. 5 shows the fastener being inserted.

FIG. 6 an axial section showing a modified form of head providing axial resilience.

While the invention has been described in connection with certain preferred embodiments, it will be understood that I do not intend to be limited to the particular embodiments shown but intend, on the contrary, to cover the various alternative and equivalent constructions included within the spirit and scope of the appended claims.

Turning now to the drawing there is shown at 10 in FIG. 1 a fastener constructed in accordance with the present invention having a rounded head 11 presenting a seating surface 12 on its underside. The head is rounded in two respects; it is rounded in profile and rounded, or domed, in cross section.

Integrally formed with the head and extending axially therefrom is a shank 15 having a base portion 16 adjacent the head as well as an end portion 17.

Secured to the end portion are a pair of retention legs 21,22 which extend, cantilever-fashion, in a direction to overlap the shank, that is, in a direction toward the seating surface on the head. The legs are symmetrical and each is of a flaring or V profile as shown in FIG. 4a, with angularly related side edges 23, 24. The legs are, moreover, outwardly sprung away from one another into V configuration as shown in FIG. 5, the normal span S preferably exceeding, to a small degree, the diameter of the opening for which the fastener is intended.

For the purpose of centering the fastener within the opening, the base portion 16 of the shank is preferably of oblong cross section having a maximum dimension $d1$ (FIG. 4) which is slightly less than the diameter of the hole and a minimum dimension $d2$, at right angles thereto, which provides clearance for inward swing of the legs as they are compressed together incident to inserting the fastener into the opening.

In accordance with one of the important aspects of the present invention each of the legs has an obtusely pointed spade-like tip presenting to the edge of the opening in the adjacent layer a pair of symmetrically angled engaging edges 25,26 which have a maximum spacing $S1$ which is greater than the total thickness $tt$ of the layers and a minimum dimension, indicated at $S2$, which is less than the total thickness.

As a result, when the fastener is inserted axially, in the direction of the arrow in FIG. 5, the retention legs are cammed slightly inward against the resilient restoring force of the plastic until the lateral corners 27, 28 clear the edge E at the inside of the opening, whereupon the legs are free to spring outwardly. However, because of the fact that the minimum spacing $S2$ is less than the total thickness of the layers, the legs 21, 22 can never "clear" the edge E of the opening. Thus the angled edges 25, 26 move outwardly only until they are seated, somewhere along their length, on the edge E. Since the two legs 21, 22 are symmetrically arranged, the engaging forces balance one another and the fastener tends to remain in its centered position.

It is one of the features of the construction that automatic take-up occurs in the event that the total thickness dimension $tt$ should ever be reduced, for example, as result of contraction of the layers due to a drop in temperature. Upon any reduction in the total thickness, the legs 21, 22 are freed to move outwardly until they again firmly seat on the edge E. Thus any tendency toward looseness of the fastener in the opening is immediately and constantly taken up, and the longer the fastener is in place the tighter it tends to be seated.

Because of the shallowness of the included angle as indicated in FIG. 4a, movement of the legs is not retrogressive, so that the fastener is held captively and cannot be removed by prying force exerted from the front of the assembly, for example by a penknife wedged under the head. Thus the fastener is ideally suited for applications where security is required as, for example, in a metal lawn building or an appliance which should not be disassembled by the user.

An obtuse included angle $a$ on the order of 135° is preferred. Making the angle $a$ less obtuse permits the same fastener to be used for a wider range of total thickness $tt$ of the captive layers. On the other hand making the angle more obtuse, while reducing the thickness tolerance, improves the wedging, or self locking, effect. It is found that the included angle should in any event be greater than 100°.

While it is a feature of the construction that the fastener cannot be removed from the front, it is nevertheless possible to remove it from the back simply by squeezing the legs together until the corners 27, 28 clear the edge E of the opening to permit the fastener to be retracted endwise.

The wedging, or crowding, of the edges 25, 26 at the tips of each of the legs, in addition to forcing the engaged layers tightly together, is accompanied by development of tension in the shank. If desired, tension may be produced in the shank by incorporating a certain amount of resilience in the head. Specifically, the head may be formed of concave section by molding an annular recess 30 in the head adjacent the seating surface 12 as shown in FIG. 6. Thus when a fastener is inserted into registry with the opening and axial pressure is applied against the domed head, for example, by the thumb of the installer, the head is deformed from its relaxed profile, indicated by the dotted line 30a, into its fully stressed profile indicated at 30b. With the head fully stressed, and with the fastener inserted to maximum degree, the legs 21, 22 are free to spread outwardly with the edges 25, 26 engaging the edge E of the opening as described. Subsequently when thumb pressure is released the head may retreat slightly to the "full line" condition shown in FIG. 6 accompanied by maintenance of tension in the shank and maintenance of a reliable level of clamping force at the points of engagement of the edges 25, 26.

The fastener is inherently strong since the legs are under axial compression. While a number of different plastics may be used for molding the fastener, plastics having relatively high stiffness modulus such as nylon, dense polypropylene or the like are preferred. The form of the construction shown in FIGs. 1–5 is readily molded, with the mold being separable parallel to the planes of the legs. The recess 30 presents a slight problem in molding because of the negative draft of the recess but this construction, too, can be molded successfully when using a plastic which is relatively flexible.

What I claim is:

1. A snap-in fastener for fastening two thin structural layers having registered openings face to face comprising, in combination, a head providing a seating surface on its underside, a relatively narrow shank projecting axially of the head, said shank mounting at its end a pair of retention legs of flat spade shape which extend back cantilever-fashion toward the seating surface on the head, each of the legs being sprung outwardly in flaring configureation with respect to one another, the presented tips of the legs being obtusely pointed as viewed in a plane perpendicular to the direction of springing movement so that each presents to the edge of the opening in the adjacent layer a pair of symmetrically angled engaging edges having a spacing, with respect to the seating surface, which lies in a range extending both above and below the total thickness dimension of the layers, the fastener being integrally molded of resilient plastic so that when the fastener is inserted into the registered openings the angled edges engage and crowd outwardly upon the edge of the opening in the adjacent layer thereby holding the fastener captive and the layers in intimate engagement with one another.

2. The combination as claimed in claim 1 in which the portion of the shank adjacent the head is of oblong cross-section having a maximum diameter to substantially fill the registered openings thereby to keep the fastener centered in the openings and the openings in register with one another, but with the portion of the shank adjacent the respective legs being of reduced thickness to provide clearance for inward movement of the legs as the fastener is pushed into seated position.

3. The combination as claimed in claim 1 in which the obtuse angle is at least 100°.

4. A snap-in fastener for fastening two thin structural layers having registered openings face to face comprising, in combination, a head of domed disc shape providing a seating surface on its underside, a relatively narrow shank projecting axially of the head, said shank mounting at its end a pair of flat retention legs which extend back cantilever-fashion toward the seating surface on the head, each of the legs being of V profile when viewed in a direction perpendicular to the flat surface thereof and sprung outwardly in V configuration to a span which exceeds the diameter of the openings, the presented tips of the legs being of obtusely pointed spade shape so that each presents to the edge of the opening in the adjacent layer a pair of symmetrically angled engaging edges having a spacing, with respect to the seating surface, which lies in a range extending both above and below the total thickness dimension of the layers, the fastener being integrally molded of resilient plastic so that when the fastener is inserted into the registered openings the angled edges engage and crowd outwardly upon the edge of the opening in the adjacent layer thereby holding the fastener captive and the layers in intimate engagement with one another.

* * * * *